(12) United States Patent  (10) Patent No.: US 7,841,931 B2
Straeter  (45) Date of Patent: Nov. 30, 2010

(54) AIRFLOW CONTROLLED COMBINE SHOE

(76) Inventor: James E. Straeter, 914 E. 100 S., Rochester, IN (US) 46975

( * ) Notice: Subject to any disclaimer, the term of this patent is extended or adjusted under 35 U.S.C. 154(b) by 0 days.

(21) Appl. No.: 12/621,874

(22) Filed: Nov. 19, 2009

(65) Prior Publication Data

US 2010/0064652 A1   Mar. 18, 2010

Related U.S. Application Data

(63) Continuation of application No. 10/568,910, filed as application No. PCT/US2004/026771 on Aug. 19, 2004, now abandoned.

(60) Provisional application No. 60/496,213, filed on Aug. 19, 2003.

(51) Int. Cl.
A01F 12/32  (2006.01)
B07B 1/00  (2006.01)

(52) U.S. Cl. .......................... 460/101; 460/99

(58) Field of Classification Search ................ 460/101, 460/100, 98, 99; 56/318, 303; 209/22, 27, 209/318
See application file for complete search history.

(56) References Cited

U.S. PATENT DOCUMENTS

| | | | |
|---|---|---|---|
| 2,253,296 A | 8/1941 | Holtzman | |
| 2,293,328 A | 8/1942 | Coburn | |
| 2,351,567 A * | 6/1944 | Welty | 460/94 |
| 2,587,918 A | 3/1952 | Stout | |
| 2,612,742 A * | 10/1952 | Heth | 56/124 |
| 2,675,809 A * | 4/1954 | Aber et al. | 460/97 |
| 2,691,444 A | 10/1954 | Oliver | |
| 2,716,556 A | 8/1955 | Williams | |
| 2,739,597 A | 3/1956 | Buttars | |
| 2,750,037 A | 6/1956 | Taylor | |
| 2,849,118 A | 8/1958 | Ashton | |
| 2,950,720 A * | 8/1960 | Sheard | 460/86 |
| 3,043,427 A | 7/1962 | Eisert | |
| 3,186,548 A * | 6/1965 | Stroburg et al. | 209/416 |
| 3,269,685 A | 8/1966 | Wallace | |
| 3,456,652 A | 7/1969 | Louks et al. | |
| 3,472,378 A | 10/1969 | Payne | |
| 3,497,229 A | 2/1970 | Sietmann et al. | |
| 3,509,885 A | 5/1970 | Louks et al. | |
| 3,533,413 A | 10/1970 | Schenk | |
| 3,628,316 A | 12/1971 | Rea et al. | |
| 3,731,470 A | 5/1973 | Cornish et al. | |
| 3,759,380 A * | 9/1973 | Mathews | 209/22 |
| 3,808,783 A | 5/1974 | Sutherland et al. | |
| 3,833,006 A | 9/1974 | Temple | |

(Continued)

FOREIGN PATENT DOCUMENTS

CA   2298195   1/2001

(Continued)

*Primary Examiner*—Árpád Fábián-Kovács

(57) ABSTRACT

A combine harvester having a frame and a crop harvesting header supported by the frame to gather crop material. A threshing and separating mechanism connected to the frame that receives the crop material from the header to thresh and separate the grain. A shoe assembly positioned beneath the threshing and separating mechanism to receive the threshed grain connected to a drive that affects fore-and-aft reciprocating movement of the shoe assembly which conveys grain rearward. A flexible seal attached to the underside of the shoe assembly across the width of the shoe to obstruct air from flowing under the shoe assembly.

7 Claims, 17 Drawing Sheets

U.S. PATENT DOCUMENTS

| | | |
|---|---|---|
| 4,007,744 A | 2/1977 | Shaver |
| 4,036,065 A | 7/1977 | Steilioff et al. |
| 4,208,858 A * | 6/1980 | Rowland-Hill ............... 56/14.6 |
| 4,219,992 A | 9/1980 | Henry |
| 4,259,829 A | 4/1981 | Strubbe |
| 4,303,079 A | 12/1981 | Claas et al. |
| 4,307,732 A | 12/1981 | De Busscher et al. |
| 4,312,366 A | 1/1982 | De Busscher et al. |
| 4,314,571 A | 2/1982 | De Busscher et al. |
| 4,344,443 A | 8/1982 | De Busscher et al. |
| 4,353,376 A | 10/1982 | Schuler |
| 4,355,647 A | 10/1982 | Heidjann et al. |
| 4,397,319 A | 8/1983 | Schuhmacher |
| 4,415,825 A | 11/1983 | Dailey et al. |
| 4,429,516 A | 2/1984 | Erickson |
| 4,441,511 A | 4/1984 | Schroeder |
| 4,471,788 A | 9/1984 | Meier et al. |
| 4,480,643 A | 11/1984 | Alm |
| 4,502,493 A | 3/1985 | Jones et al. |
| 4,531,528 A * | 7/1985 | Peters et al. .................. 460/97 |
| 4,535,788 A | 8/1985 | Rowland-Hill et al. |
| 4,538,404 A | 9/1985 | Heimark et al. |
| 4,548,214 A | 10/1985 | Sheehan et al. |
| 4,557,276 A | 12/1985 | Hyman et al. |
| 4,589,425 A | 5/1986 | Mitchell, Jr. |
| 4,598,718 A | 7/1986 | Glaubitz et al. |
| 4,614,197 A | 9/1986 | Weber et al. |
| 4,627,446 A | 12/1986 | Huhman |
| 4,677,991 A | 7/1987 | Harris et al. |
| 4,700,537 A | 10/1987 | Emmert |
| 4,712,568 A | 12/1987 | Strong et al. |
| 4,723,558 A | 2/1988 | Usick |
| 4,736,753 A | 4/1988 | Glaubitz et al. |
| 4,751,932 A | 6/1988 | Busboom |
| 4,770,190 A | 9/1988 | Barnett |
| 4,863,415 A | 9/1989 | Carnewal et al. |
| 4,897,071 A | 1/1990 | Desnijder et al. |
| 4,897,072 A | 1/1990 | Bestland |
| 4,906,219 A | 3/1990 | Matousek et al. |
| 4,968,284 A | 11/1990 | Klimmer et al. |
| 4,968,285 A | 11/1990 | Schuhmacher |
| 5,077,964 A | 1/1992 | Kabat |
| 5,205,786 A * | 4/1993 | Murphy ........................ 460/9 |
| 5,256,106 A | 10/1993 | Shrawder |
| 5,282,771 A | 2/1994 | Underwood |
| 5,320,047 A | 6/1994 | Deurloo et al. |
| 5,322,025 A | 6/1994 | Sherman et al. |
| 5,338,257 A | 8/1994 | Underwood |
| 5,387,154 A | 2/1995 | Peters |
| 5,403,235 A | 4/1995 | Baumgarten |
| 5,405,292 A | 4/1995 | McConnell |
| 5,489,029 A | 2/1996 | Jonckheere et al. |
| 5,525,108 A | 6/1996 | Rouse et al. |
| 5,527,219 A | 6/1996 | Schumacher et al. |
| 5,558,576 A | 9/1996 | Meyers |
| 5,624,315 A | 4/1997 | Jonckheere |
| 5,787,697 A | 8/1998 | Post |
| 5,795,223 A | 8/1998 | Spiesberger et al. |
| 5,984,777 A | 11/1999 | Kuchar |
| 6,056,639 A | 5/2000 | Gryspeerdt et al. |
| 6,066,045 A | 5/2000 | Noomen |
| 6,117,006 A | 9/2000 | Hofer |
| 6,238,285 B1 | 5/2001 | Gryspeerdt et al. |
| 6,261,051 B1 | 7/2001 | Kolacny |
| 6,358,141 B1 | 3/2002 | Stukenholtz et al. |
| 6,412,260 B1 | 7/2002 | Lukac et al. |
| 6,463,722 B1 | 10/2002 | De Groot |
| 6,468,154 B1 | 10/2002 | Eggenhaus et al. |
| 6,579,172 B2 | 6/2003 | Lauer |
| 6,582,298 B2 | 6/2003 | Wolters |
| 6,585,584 B2 | 7/2003 | Buermann |
| 6,672,957 B2 | 1/2004 | Voss et al. |
| 6,832,953 B1 | 12/2004 | Ennen |
| 6,843,719 B1 | 1/2005 | Sacquitne |
| 7,094,146 B2 | 8/2006 | Holmen |
| 7,322,424 B2 | 1/2008 | Kido |
| 2002/0086722 A1 * | 7/2002 | Kuhn et al. .................. 460/100 |
| 2004/0023704 A1 * | 2/2004 | Grywacheski et al. ........ 460/99 |
| 2004/0226275 A1 * | 11/2004 | Baumgarten et al. .......... 56/153 |
| 2005/0164755 A1 | 7/2005 | Nelson et al. |
| 2005/0282601 A1 | 12/2005 | Duquesne et al. |
| 2006/0229119 A1 * | 10/2006 | Wamhof et al. ............. 460/101 |
| 2006/0242935 A1 | 11/2006 | Rayfield et al. |
| 2006/0281506 A1 * | 12/2006 | Weichholdt ................ 460/101 |

FOREIGN PATENT DOCUMENTS

| | | |
|---|---|---|
| EP | 0323833 | 7/1989 |
| EP | 0548411 | 6/1993 |
| GB | 2052238 | 1/1981 |
| GB | 2146218 | 4/1985 |
| WO | 2005018303 | 3/2005 |

* cited by examiner

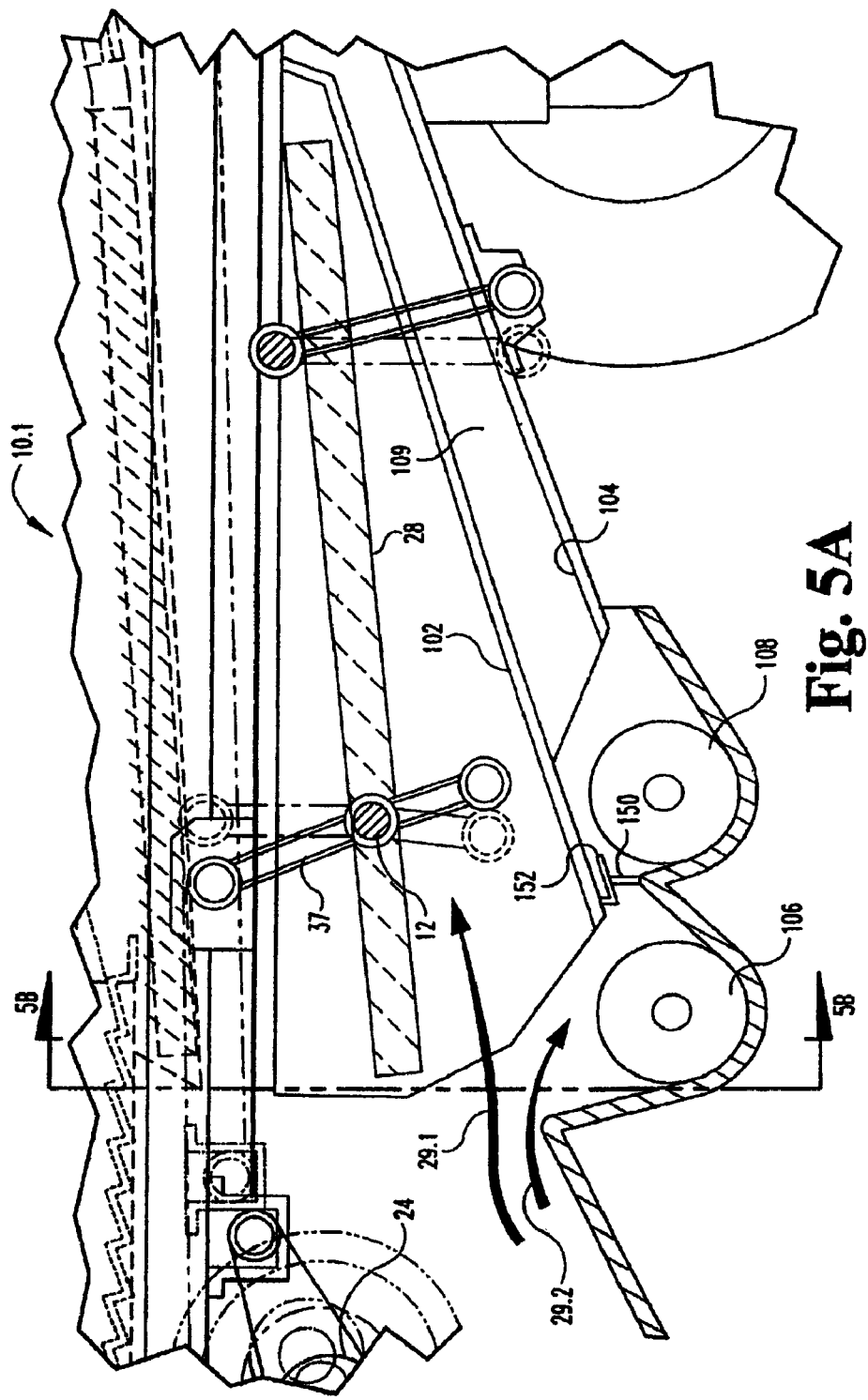

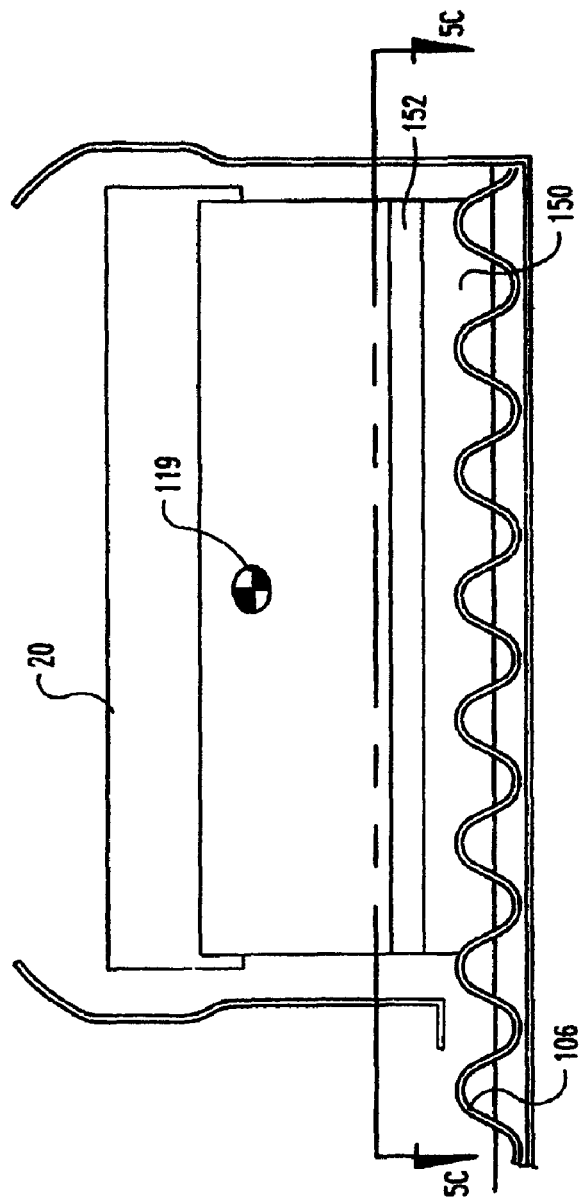
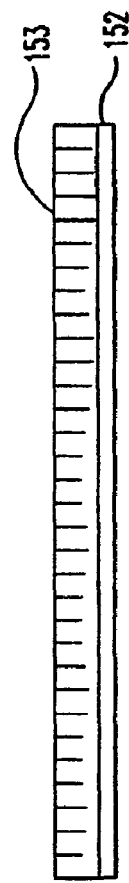
Fig. 5B
Fig. 5C

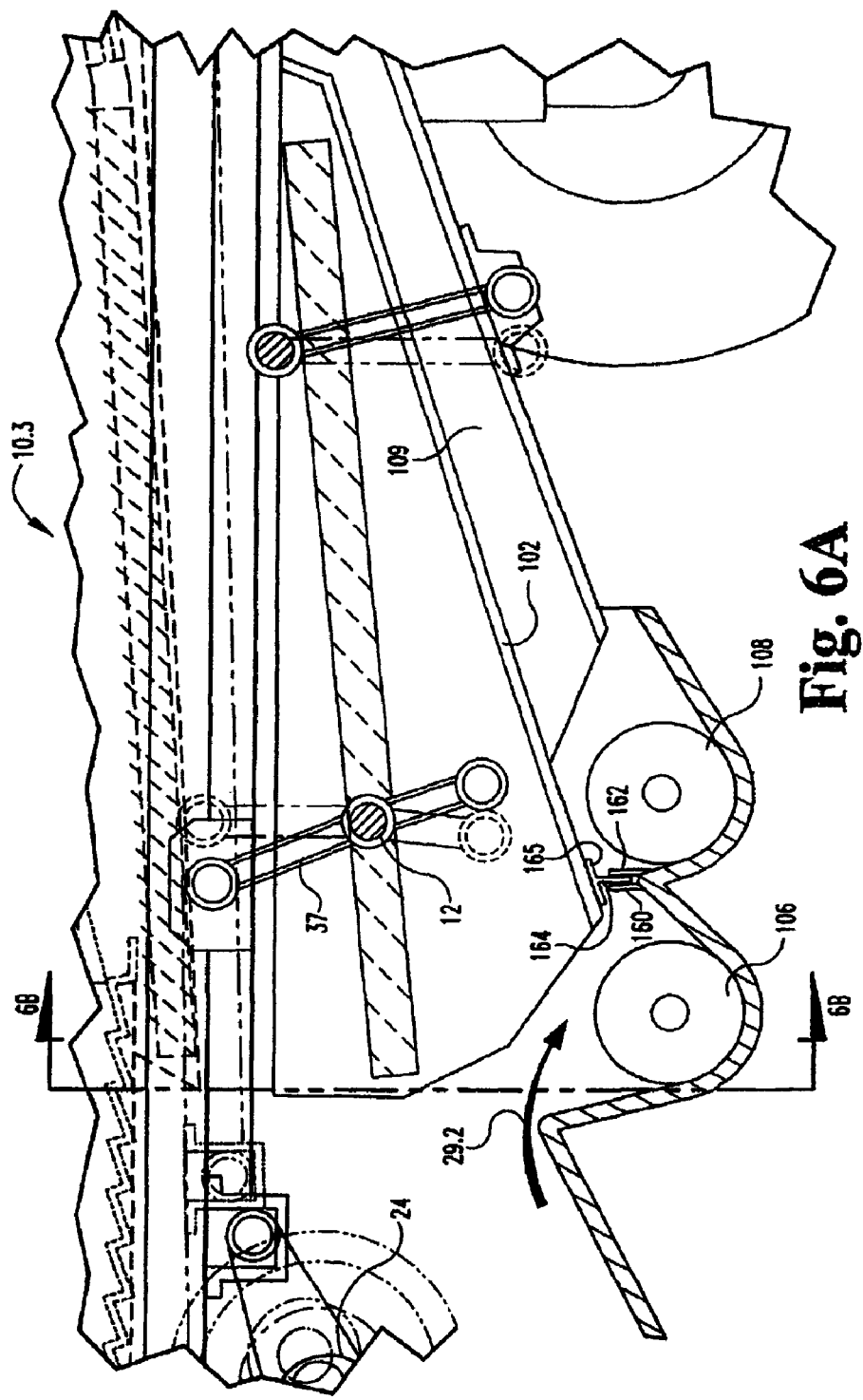

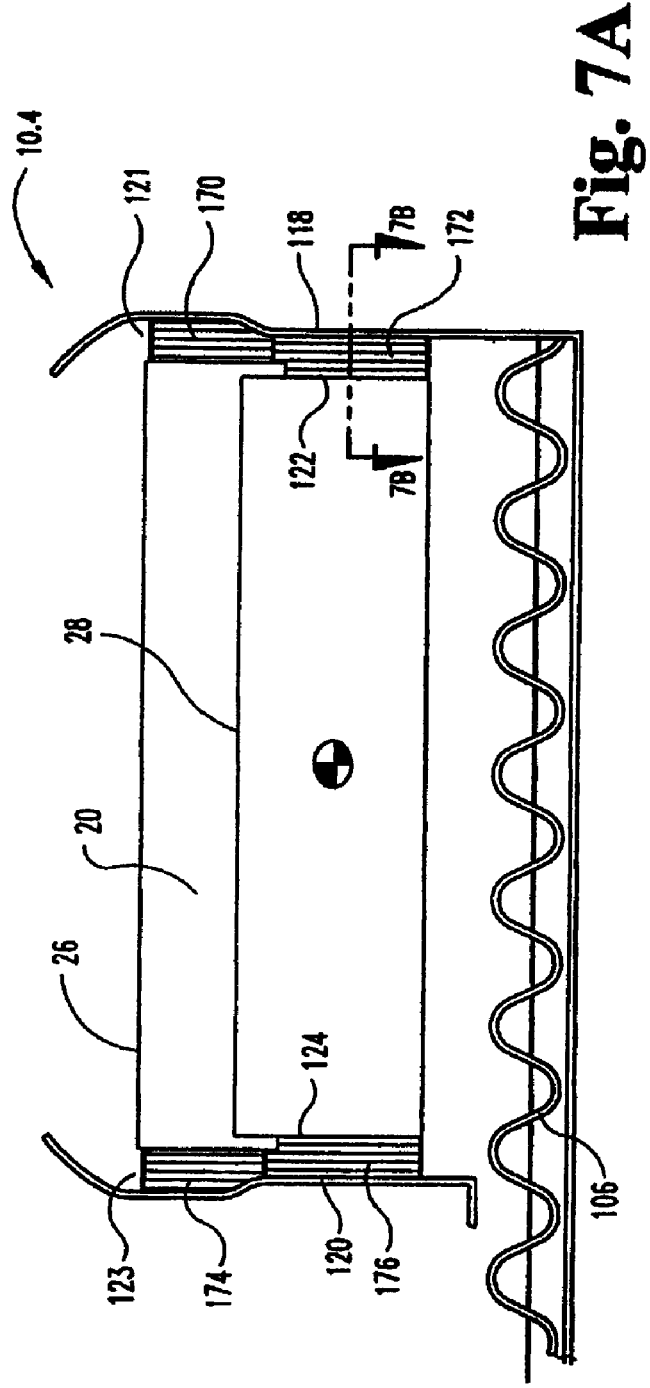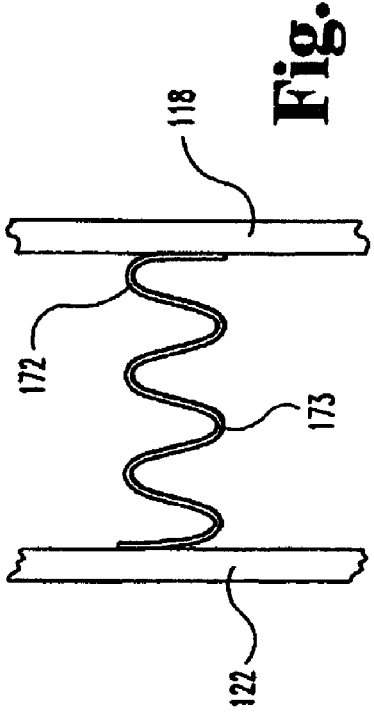

AIRFLOW CONTROLLED COMBINE SHOE

CROSS REFERENCE TO A RELATED APPLICATION

This application is a continuation of U.S. patent application Ser. No. 10/568,910 filed Feb. 14, 2007 which is a National Stage Entry of PCT/US04/26771 filed Aug. 19, 2004 which claims priority to U.S. Provisional Patent Application Ser. No. 60/496,213 filed Aug. 19, 2003.

BACKGROUND OF THE INVENTION

The invention relates to methods and apparatus for controlling the flow of air in a combine, especially a combine with a self-leveling shoe assembly.

A significant advance in the field of harvesting farm products is the addition of a reciprocating shoe assembly to a combine. A quantity of air is blown over a pair of reciprocating sieves. The combination of reciprocating motion and airflow separates the harvested product from unwanted chaff. By careful control of the flow of air, the oscillating motion of the sieves, and the location of the shoes, the separated product is fed into one auger, and the unwanted chaff is discharged.

However, as the combine traverses along the side of a hill, the efficiency of separation by the shoes is affected by the inclination of the combine. With the advent of the self-leveling shoe assembly (such as that described in U.S. Pat. No. 4,344,443 incorporated herein by reference), the efficiency of separation is somewhat restored. The self-leveling feature permits the pair of reciprocating sieves to stay in a more constant orientation relative to gravity, and the harvested product is more consistently separated.

However, one problem with some self-leveling shoe assemblies is inadequate control of air flowing within the combine. In some applications, the lower seal between the bottom of the shoe assembly and the static floor of the combine is fixed such that underside gaps are created when the shoe assembly pivots to maintain level operation. Air is permitted to flow through this unwanted gap, which affects the pattern of air flowing over the sieves for separation of the product. Separation is thus made less efficient. Further, in some self-leveling shoes there are largely unsealed gaps on the lateral sides of the shoe assembly (gaps between the lateral sides of the pivoting structure and the non-pivoting, static structure that faces the pivoting structure). In these applications, air can flow unimpeded around the sides of the self-leveling shoe, even when the combine is level and the shoe is not pivoted.

What is needed are apparatus and methods for improved airflow control of self-leveling shoes. The present invention does this in novel and unobvious ways.

BRIEF SUMMARY OF THE INVENTION

It is one aspect of some embodiments of this invention to overcome the disadvantages of other designs by providing a separation of flow areas in the self-leveling shoe.

It is another aspect of some embodiments of this invention to provide for any type of seals which would accomplish this separation.

It is another aspect of some embodiments of this invention to provide for adjustment of the separation effectiveness, both during operation of the combine and during non-operation.

It is another aspect of some embodiments of this invention to allow for the separation of the areas as described without impeding the 'double action' of the shoe whereby the upper sieve moves in the opposite direction of the lower sieve.

It is another aspect of some embodiments of this invention to provide for operation without input by the operator.

It is another aspect of some embodiments of this invention to seal off areas and thereby prevent both air and grain movement between certain components.

These and other aspects of various embodiments of the invention will be apparent from the drawings, description and claims to follow.

BRIEF DESCRIPTION OF THE DRAWINGS

FIG. 5A is a cutaway side elevational view of an apparatus according to one embodiment of the present invention;

FIG. 5B is a view of the apparatus of FIG. 5A as taken along line 5B-5B;

FIG. 5C is a view of a seal member of FIG. 5B as taken along line 5C-5C;

FIG. 6A is a cutaway, side elevational view of an apparatus according to another embodiment of the present invention;

FIG. 7A is a schematic representation of an end view of an apparatus according to another embodiment of the present invention;

FIG. 7B is a cutaway of the apparatus of FIG. 7A as taken along line 7B-7B;

DETAILED DESCRIPTION OF THE PREFERRED EMBODIMENT

Figure 1:
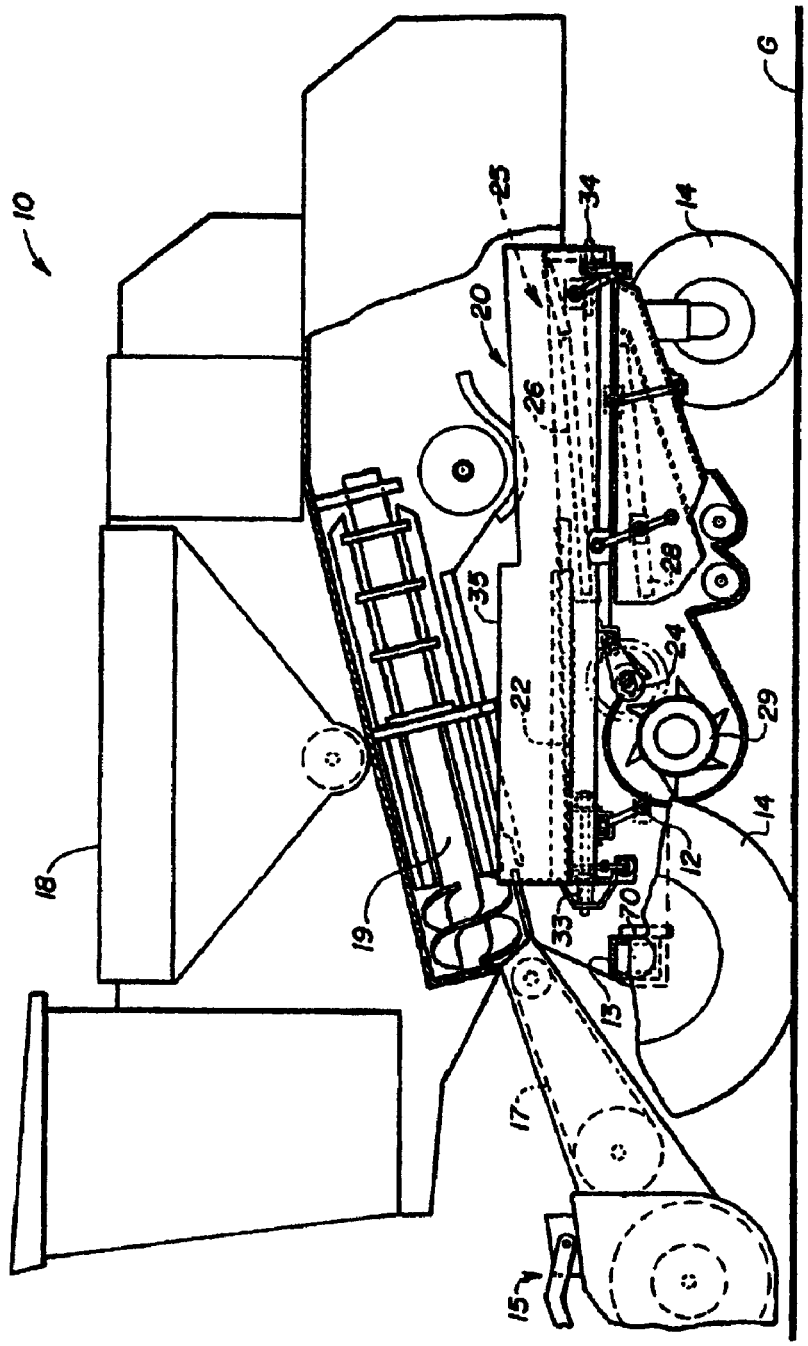
FIG. 1 is a partially cutaway, side elevational view of a known combine.
Figure 2:
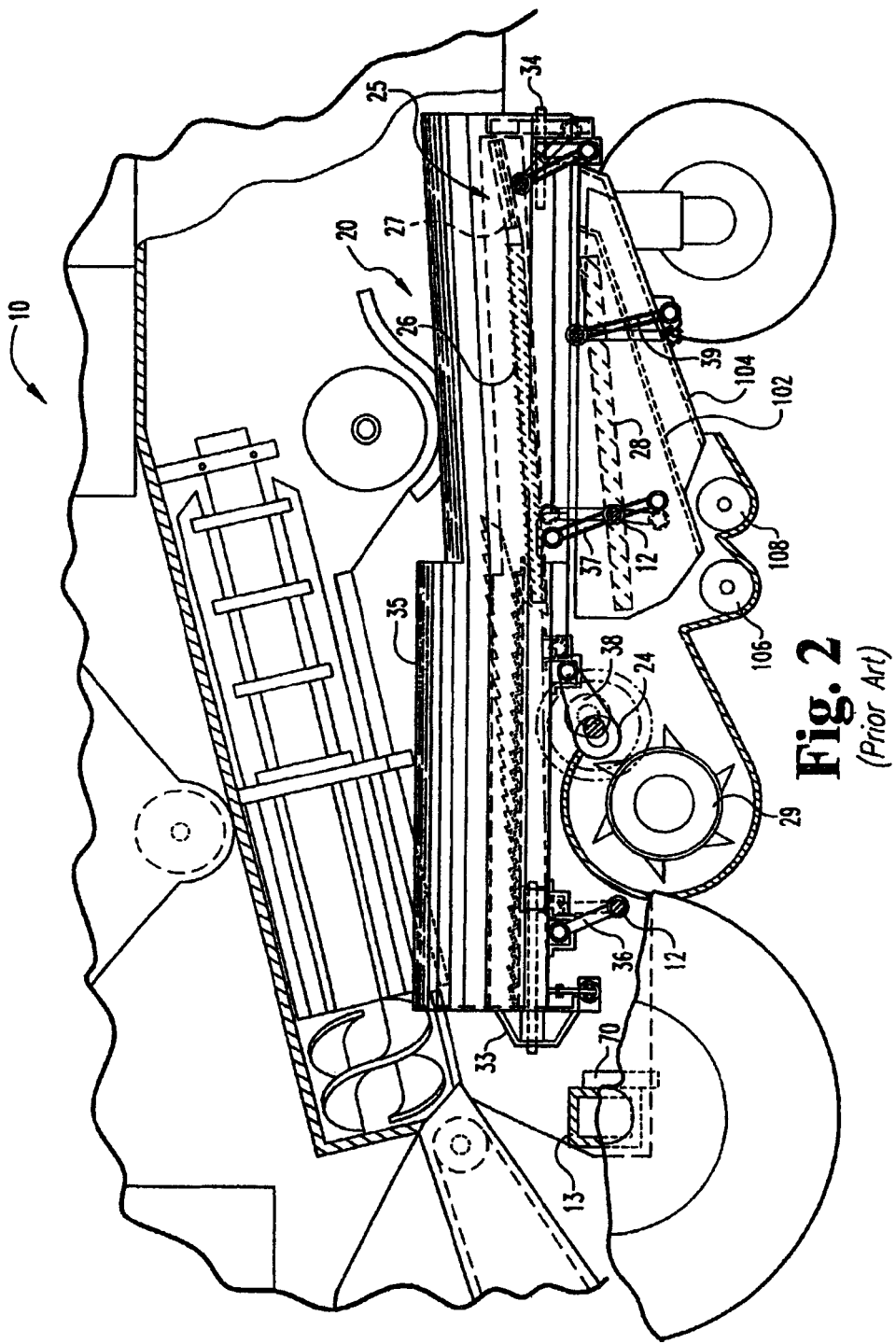
FIG. 2 is a close-up of a portion of the combine of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates generally to combine harvesters and more particularly, to improvements in the cleaning apparatus which permit leveling of the cleaning components in non-level field operation. It has been shown that by keeping the cleaning components level there are benefits of even distribution of grain in the cleaning area as well as more consistent air flow owing to consistent depth of grain and MOG (material other than grain). Such a system is described in U.S. Pat. Nos. 4,535,788 and 3,731,470 and 4,344,443, all incorporated herein by reference. These separate patents described different methods of keeping the sieves level. This application pertains to any self-leveling systems where a change in orientation occurs between the cleaning components and some of the frame components of the combine.

This application includes sealing systems and pertains to the idea of providing seals proximate to the self-leveling systems with some specific non-limiting examples of type of seals. In some embodiments of the present invention, the methods and apparatus disclosed herein pertain to redirecting airflow which could otherwise be described as leakage or misdistributed flow to instead flow through the bottom of the lower shoe to better assist in cleaning. The application also covers methods using seals or not using seals which could provide for differentiation of air pressure in redirection of airflow to components in a shoe which change orientation to provide for levelness during operation.

A fan 29 provides air pressure to the front of the shoe assembly 20 including upper and lower reciprocating sieves 26 and 28, respectively. This air can pass through the sieves, thereby carrying lighter material (usually MOG) with it for delivery out of the combine while leaving heavier material (usually grain) falling through the sieves for delivery to the tank 18 via the clean grain auger 106.

In some known combines with self-leveling shoes, air is allowed to pass under the lower shoe components through the auger area and up the tailings transport area 3 to the rear of the lower shoe or sieve 6, thereby avoiding passing through the shoe or sieve itself. Heavier crops are especially susceptible to this misdirection of airflow since they provide more air blockage while on sieves. The air which is delivered to the rear of the lower sieve effectively neutralizes, or greatly reduces, the difference in pressure under the lower sieve compared to the pressure above the lower sieve. This reduction/neutralization stalls or reduces airflow through the sieve and impedes the cleaning effectiveness of the air system.

In a combine harvester equipped with a shoe that maintains level orientation regardless of the tilt of the combine frame, a sealing system may be provided to separate certain areas of the cleaning shoe. In some embodiments of the present invention there is a provision of pressure differentiation that can be accomplished in other manners such as by a second fan, compressor, or other active pressurizing device in the cleaning shoe area separate from fan 29. It could also be provided by such a device located outside of the shoe area being connected to the shoe by an air delivery system. Various embodiments of this invention pertain to all types of sealing apparatus, methods, and blowing devices that provide separate pressure areas in a self-leveling shoe. In those embodiments in which a second fan or blower is installed, it may also be desirable to control the speed of both fans to provide the correct flow of air through the lower shoe.

In some cases, significant airflow and pressure differentiation may not be desirable, such as light grass seed crops. It may also be beneficial to be able to adjust the differentiation either "on the go" or while not in operation. It is the intent of this application to include the capability to adjust how much sealing is done and thereby adjust how much airflow and pressure differentiation is provided for crop cleaning.

Referring to FIGS. 1-4, a side elevational view of a known combine is shown. Although specific reference to a known combine will be made, the present invention is not limited in its application to any specific combine, and is generally applicable to any combine having a self-leveling shoe. Any left and right references are used as a matter of convenience and are determined by standing at the front of the machine, facing the rearward end. The combine 10 is provided with a main frame 12 having at least one transversely disposed beam 13 mobilely supported over the ground G by wheels 14. A crop harvesting header 15 is forwardly supported from the frame 12 to gather crop material and convey it rearwardly via a feeding mechanism 17 to a threshed and separating mechanism 19. The threshing and separating mechanism 19 is operable to thresh the crop material fed thereto and separate the threshed grain from the trash material to precipitate the threshed grain downwardly through the threshing and separating mechanism 19 and to discharge the trash material along a separate path to be deposited on the ground G rearward of the combine 10.

A shoe or sieve assembly 20 is positioned beneath the threshing and separating mechanism 19 to receive the threshed grain precipitated therefrom on a grain pan 22. Generally, the shoe assembly 20 is operatively connected to an eccentric drive 24 to affect a generally fore-and-aft reciprocating movement of the shoe assembly 20 to convey the thresh grain in a rearward direction. A sieve means 25 is positioned rearwardly of the grain pan 22 to receive threshold grain conveyed rearwardly therefrom and clean the threshed grain from chaff and other debris conveyed therewith. Typically, the sieve means 25 includes an upper chaffer shoe 26 and a lower cleaning shoe 28 mounted for opposing fore-and-aft reciprocating movement and in flow communication with air being blown from a fan 29 upwardly through the shoe 26,28 to remove chaff and debris from the threshed grain. Cleaned grain passing through the sieve means 25 is conveyed into a storage tank 18 supported on the main frame 12.

The grain pan 22 and chaffer shoe 26 are mounted in a subframe 31 which in turn is pivotally supported by fore-and-aft extending and longitudinally spaced pivots 33,34 within a shaker shoe 35. A tailings return section 27 is positioned at the rear of the chaffer shoe 26 and is pivotally movable therewith. The tailings return section 27 is cooperable with conventional apparatus for the return of unthreshed heads to the threshing and separating means 19. The shaker shoe 35 is pivotally supported from the frame 12 by connecting links 36,37 incorporating rubber bushings in a conventional manner to permit a fore-and-aft reciprocating movement induced by a drive arm 38 interconnecting the shaker shoe 35 and the eccentric drive 24. The lower cleaning shoe 28 is supported from the frame 12 by connecting links 37, 39 in a similar manner to permit a fore-and-aft reciprocating movement. By utilizing the center connecting link 37 with a frame mounting point intermediate the connection between the shaker shoe 35 and the lower cleaner shoe 28, the shaker shoe 35 and lower shoe 28 are drivingly reciprocating in opposing fore-and-aft directions in a manner conventionally known by one skilled in the art.

Further details of the operation of combine 10 can be found in U.S. Pat. No. 4,535,788, incorporated herein by reference. Shoe assembly 20 is self-leveling in response to the attitude of combine 10. As combine 10 moves on an inclined field and rolls relative to the combine's longitudinal axis, the change in attitude is detected by a sensor. The sensor signal is provided to an electronic controller which is operatively connected to shoe assembly 20 and capable of rolling shoe assembly 20 to keep upper shoe 26 and lower shoe 28 generally level relative to gravity. Although a particular apparatus for separating threshed grain in a self-leveling shoe assembly has been shown and described, the present invention is not so limited. The present invention contemplates usage with any type of self-leveling shoe assembly.

Referring again to FIG. 2, combine 10 includes a clean grain pan 102 which is located below lower cleaning shoe 28. Grain being sifted through lower shoe 28 falls onto lower clean grain pan 102 and under gravity slides into clean grain auger 106, which transports the clean grain to an elevator (not shown) and on to storage. Tailings coming off upper shoe 26 fall onto the aft portion tailings pan 104, which is located generally underneath clean grain pan 102. Tailings and chaff falling into the area 107 between the end of the clean grain pan 102 and end of the tailings pan 104 fall down along the tailings pan and into tailing auger 108, which transports the tailings for a subsequent reseparation by shoe assembly 20.

Figure 3:
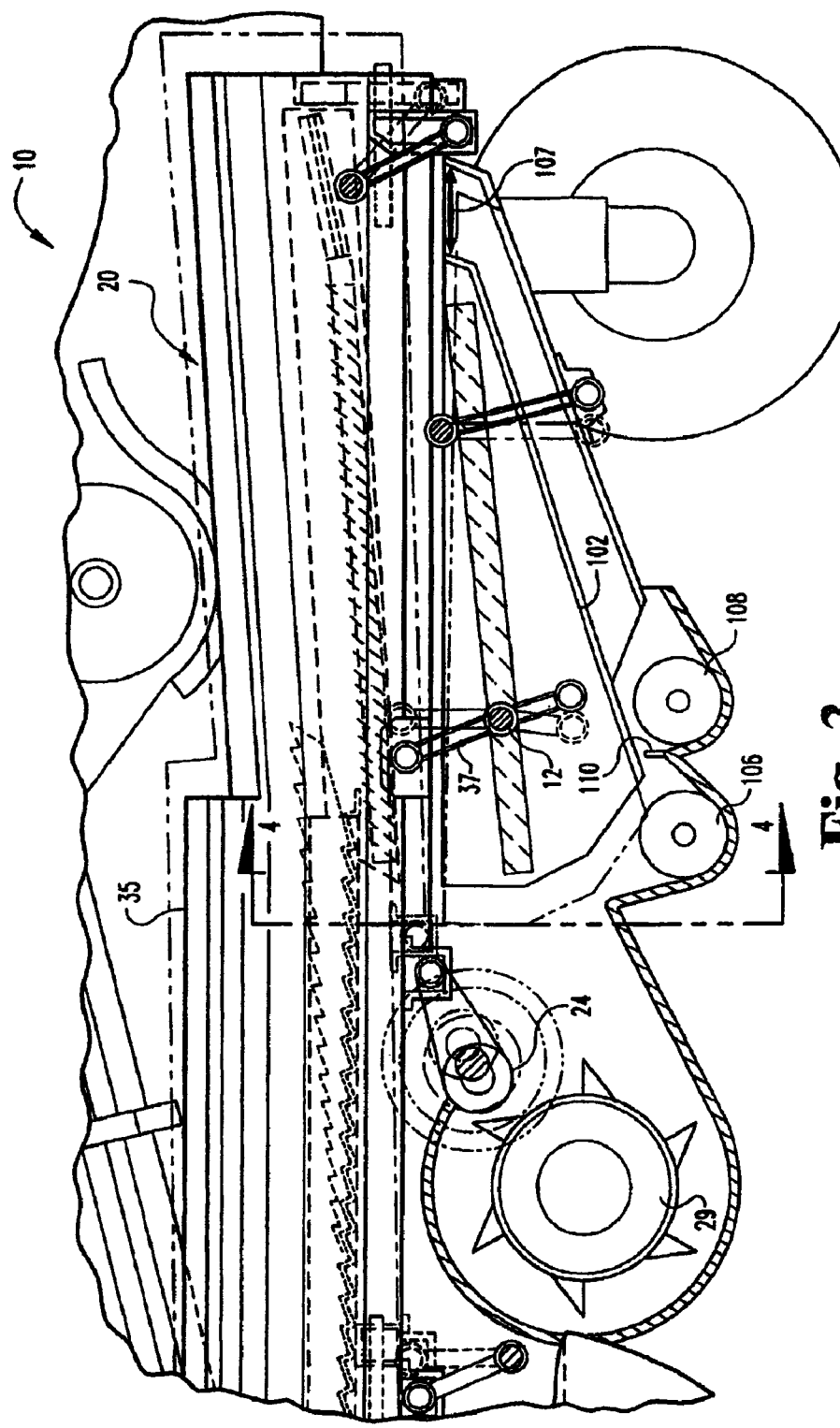
FIG. 3 is a close-up of the self-leveling shoe of the combine of FIG. 1.

Referring to FIG. 3, combine 10 includes a static seal 110 which is attached to the bottom of the combine between augers 106 and 108. This stationary seal is shown again in FIG. 4 as viewed along the longitudinal axis of combine 10. Seal assembly 110 includes a metal holding structure 112 which is attached to static structure of combine 10. Right and left flexible seals 114 and 116, respectively, are attached to structural member 112. The upward ends of flexible seals 114 and 116 are located below the bottom of shoe assembly 20, either below clean grain pan 102 (as shown in FIG. 3), or alternatively below the pivoting structure of shoe assembly 20 immediately in front of pan 102. Generally, there is a gap between the top edge of seals 114 and 116 and the bottom of shoe assembly 20.

Figure 4:
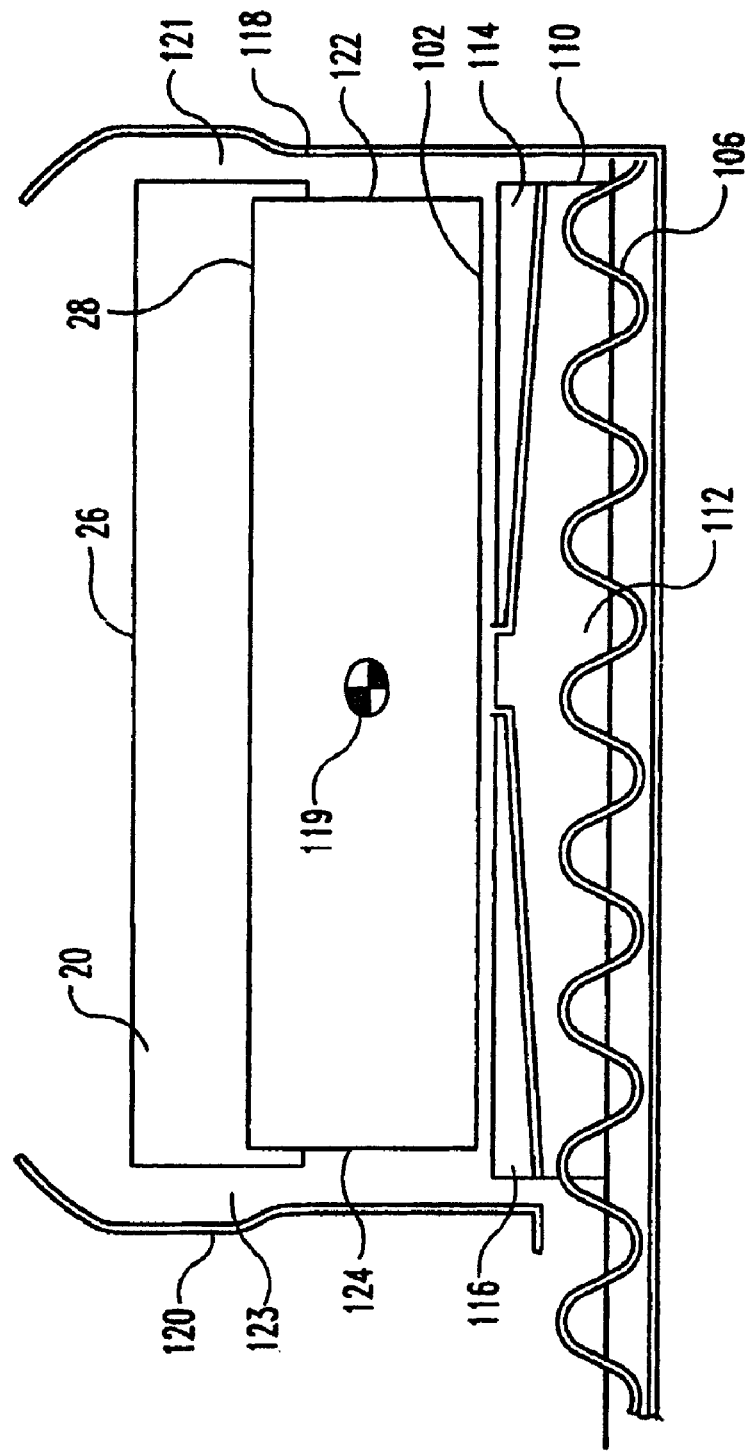
FIG. 4 is a view of the apparatus of FIG. 3 as taken along line 4-4.

Referring to FIG. 4, shoe assembly 20 with upper shoe 26 and lower shoe 28 is generally centered between right and left static sides 118 and 120, respectively, of combine 10. The typical placement of shoe assembly 20 within combine 10 results in a right side gap or pathway 121 between right side 122 of shoe 20 and right side structural member 118. Likewise, a left side gap or pathway 123 is formed between the left side 124 of shoe assembly 20 and the left side structural portion 120 of combine 10. Air being blown from fan 29 toward shoe 20 is free to flow through either side passage 121 or 123 towards the aft of combine 10. In those situations where shoes 26 and 28 are heavily matted, especially with heavy, wet corn grain, this matting blockage of shoes 26 and 28 results in increased airflow through passageways 121 and 123, as well as underneath shoe assembly 20 and above seal member 110.

Seal members 114 and 116 are both tapered across the width of shoe assembly 20. As best seen in FIG. 4, the interior most end of each seal member is generally narrow and the outmost edge is broader. This change in seal height accommodates pivoting of shoe assembly 20. Since the shoe assembly pivots in the middle, there is relatively little change in the distance between the bottom of shoe assembly 20 and the top seal assembly 110 during pivoting. The greatest change in distance occurs along either side of shoe assembly 20. For example, clockwise pivoting of shoe assembly 20 about rotational center 119 results in increased clearance above seal member 116, and contact between portions of seal member 114 and the bottom of clean grain pan 102. Thus, pivoting movement of shoe assembly 20 results in increased flow of air from fan 29 underneath at least one side of shoe assembly 20. Further, air flowing from fan 29 is free to flow around either side of shoe assembly 20, between the sides of the shoe assembly and the nearby corresponding static structure of combine 10.

FIGS. 5-15 depict various embodiments of the present invention. Some of these drawings and their accompanying description use the numbering system previously established for a known combine 10. However, it is understood that these drawings and their description pertain to various embodiments of the present invention.

FIGS. 5A, 5B, and 5C relate to one embodiment of the present invention as applicable to a combine 10.1. Combine 10.1 in one embodiment is the same as combine 10, but further includes first and second seals 150 and 152. Seals 150 and 152 are placed between the bottom of grain pan 102 and the bottom static structure of combine 10.1. Preferably, seals 150 and 152 are located aft of auger 106 and in front of auger 108. This placement of seals 150 and 152 discourages air from fan 129 from flowing as indicated by arrow 29.2. By discouraging flow in this pathway, and also discouraging this flow from flow path 109 between clean grain pan 102 and tailings pan 104, air flow from fan 29 is thereby encouraged to flow underneath shoe 28, as indicated by arrow 29.1.

Seal 152 is attached at one end to the underside of pan 102, and thereby pivots with shoe assembly 20. In one embodiment, seal 152 includes a flexible portion in contact with static seal 150, although other embodiments of the present invention include a flexible portion on static seal 150, or on both seals 150 and 152. Further, seals 150 and 152 are adapted and configured to accommodate the reciprocating motion of shoe assembly 20. For the seals shown in FIG. 5A, this accommodation is achieved by having a portion of seal 152 which has a lengthwise portion sized to remain in engagement with static seal 150 during all reciprocating motion. However, the present invention contemplates including a lengthwise section on static seal 150, or on both seals 150 and 152.

Referring to FIGS. 5B and 5C, seal members 150 and 152 preferably have a width that is generally as wide as shoe assembly 20. As best seen in FIG. 5C, seal member 152 includes an overlapping portion 153 which is preferably slit into a plurality of small flaps. As shoe assembly 20 rolls about axis 119, the slit nature of seal 152 provides for improved contact between seals 152 and 150.

In yet another embodiment of the present invention, a combine 10, which is the same as combine 10, except as shown and described differently herein, includes a static seal assembly 110. Seal assembly 110 is preferably attached to static structure of combine 10 in between augers 106 and 108. Static seal 110 preferably extends across the width of shoe 20, and is slit into a variety of flaps, the spacing of the slits and the length of the flaps being adapted and configured such that substantially all of the flaps remain in contact with the underside of pan 102 during pivoting motion of shoe assembly 20.

Figure 6B:
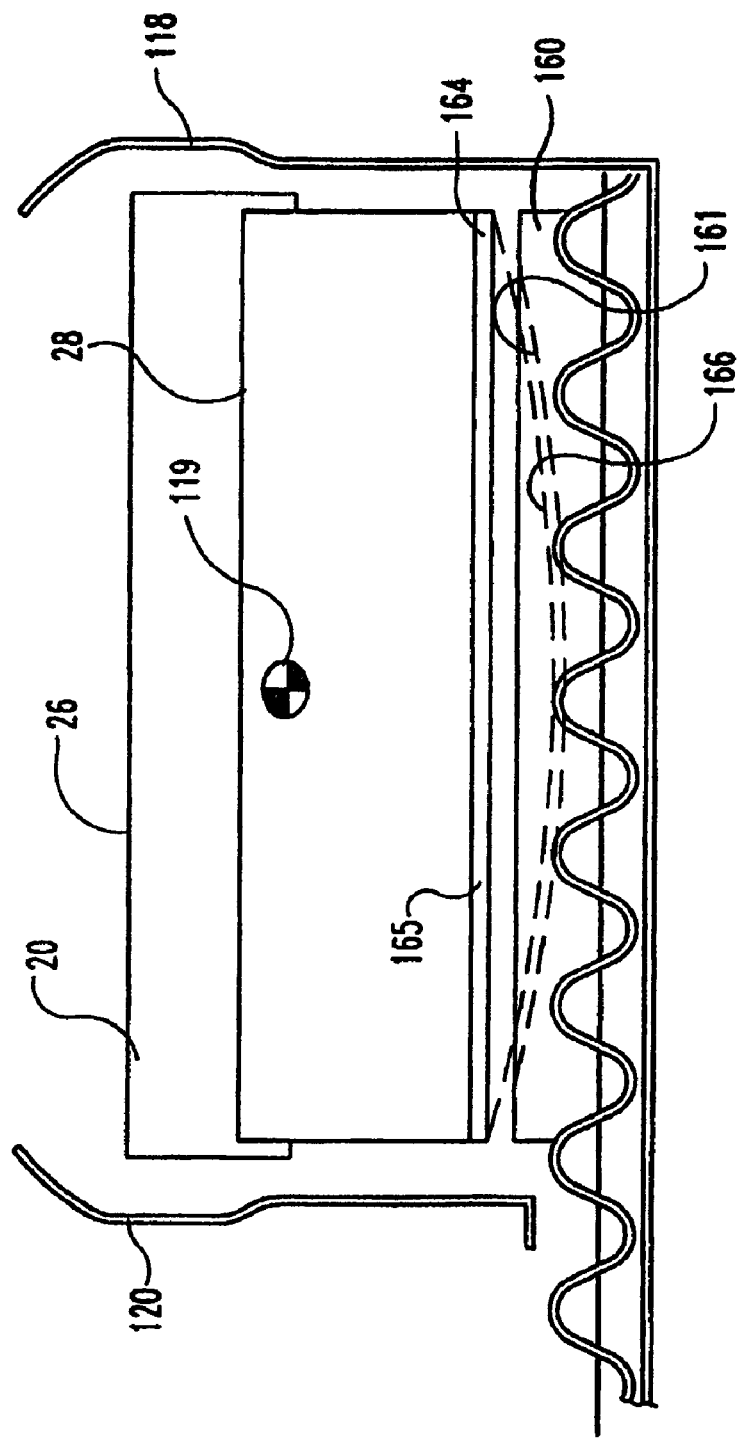
FIG. 6B is a schematic representation of the apparatus of FIG. 6A as taken along line 6B-6B.

FIGS. 6A and 6B depict another embodiment of the present invention. Combine 10.3 includes a seal assembly comprising members 160, 162, and 164, preferably located between augers 106 and 108. Combine 10.3 is the same as combine 10, except for the differences shown and described herein.

A pair of seal members 160 and 162 are attached to stationary structure of combine 10.3, preferably aft of grain auger 106. Seal members 160 and 162 are generally parallel to one another and define a channel therebetween. A third seal member 164 is slidingly received within this channel. Seal member 164 includes a top portion 165 which in some embodiments of the present invention is in sliding contact with the underside of pan 102. In yet other embodiments, seal member 164 is attached to pan 102. Referring to FIG. 6B, it can be seen that seal member 164 includes a portion 166 which extends within the channel and is rounded in shape. In some embodiments, this rounded portion 166 is received within a complementary-rounded channel 161 between seal members 160 and 162. Seal portion 166 and channel bottom 161 are adapted and configured to permit sliding contact of seal portion 166 within channel 161 without interfering with pivoting motion of shoe 20 about roll center 119. Thus, a substantial portion of seal portion 164 is within channel 161. As best appreciated by viewing FIG. 6A, this configuration includes that a portion of any air flowing along arrow 29.2 travels the circuitous path over first seal member 160, within the channel and around seal portion 166, and finally around aft seal member 162 before flowing into flow path 109. Thus, the assembly of seals 160, 162, and 164 discourage air from flowing within flow path 109.

Although what has been shown and described with regard to FIGS. 6A and 6B shows the channel-forming members being attached to the stationary structure of combine 10.3, the present invention also contemplates those embodiments in which the channel-forming members are attached to a portion of pivoting shoe assembly 20.

FIGS. 7A and 7B show portions of a combine 10.4 according to another embodiment of the present invention. Combine 10.4 is the same as combine 10, except that as shown and described differently herein.

Combine 10.4 includes at least one sealing member between a side of cleaning shoe 20 and the corresponding and proximate stationary structure of combine 10.4. As best seen in FIG. 7A, combine 10.4 preferably includes a plurality of flexible sealing members 170, 172, 174, and 176. Sealing members 170 and 174 seal the flowpath between the upper shoe assembly 26 and the adjacent stationary structure (the upper portions of stationary structure 118 and 120, respectively). In some embodiments, combine 10.4 further includes a pair of lower seals 172 and 176 which seal the flow path between the lower shoe and the corresponding adjacent stationary structure (the lower portions of walls 118 and 120, respectively).

Referring to FIG. 7B, a typical cross section of a side seal according to one embodiment of the present invention is shown. Seal member 172 preferably includes a plurality of convolutions 173 which extend in a fore and aft direction, so as to accommodate the reciprocating motion of the lower shoe. One end of seal member 172 is attached to stationary structure 118. The other end of seal member 172 is attached to a side 122 of shoe assembly 20 that is attached to lower shoe 28. Convolutions 173 are adapted and configured not only to accommodate reciprocating motion of shoe assembly 20, but also to accommodate pivoting motion. In one embodiment, convolutions 173 are formed from a flexible elastomeric material, which in some embodiments includes internal reinforcing wires, especially metal wires.

In one embodiment, seal 170 is located generally over seal 172; seal 174 is located generally over seal 176. As shoes 26 and 28 reciprocate in the alternating pattern previously described, gaps are formed at the interface between seal 170 and 172 and at the interface between seal 174 and 176. These gaps permit a slight flow of air. However, seals 170 and 172 are effective in discouraging flow along the right side of shoe 20 in flow path 121, and along the left side of shoe 20 in flow path 123. As the term "seal" is used herein, it is appreciated that complete sealing is not required.

Further, it is appreciated that the various embodiments of the invention described herein can be combined. For example, the side seals of combine 10.4 can be included with the bottom seals of combines 10.1, 10.2, and 10.3. Further, the present invention contemplates combining multiple bottom seal arrangements.

Figure 8:
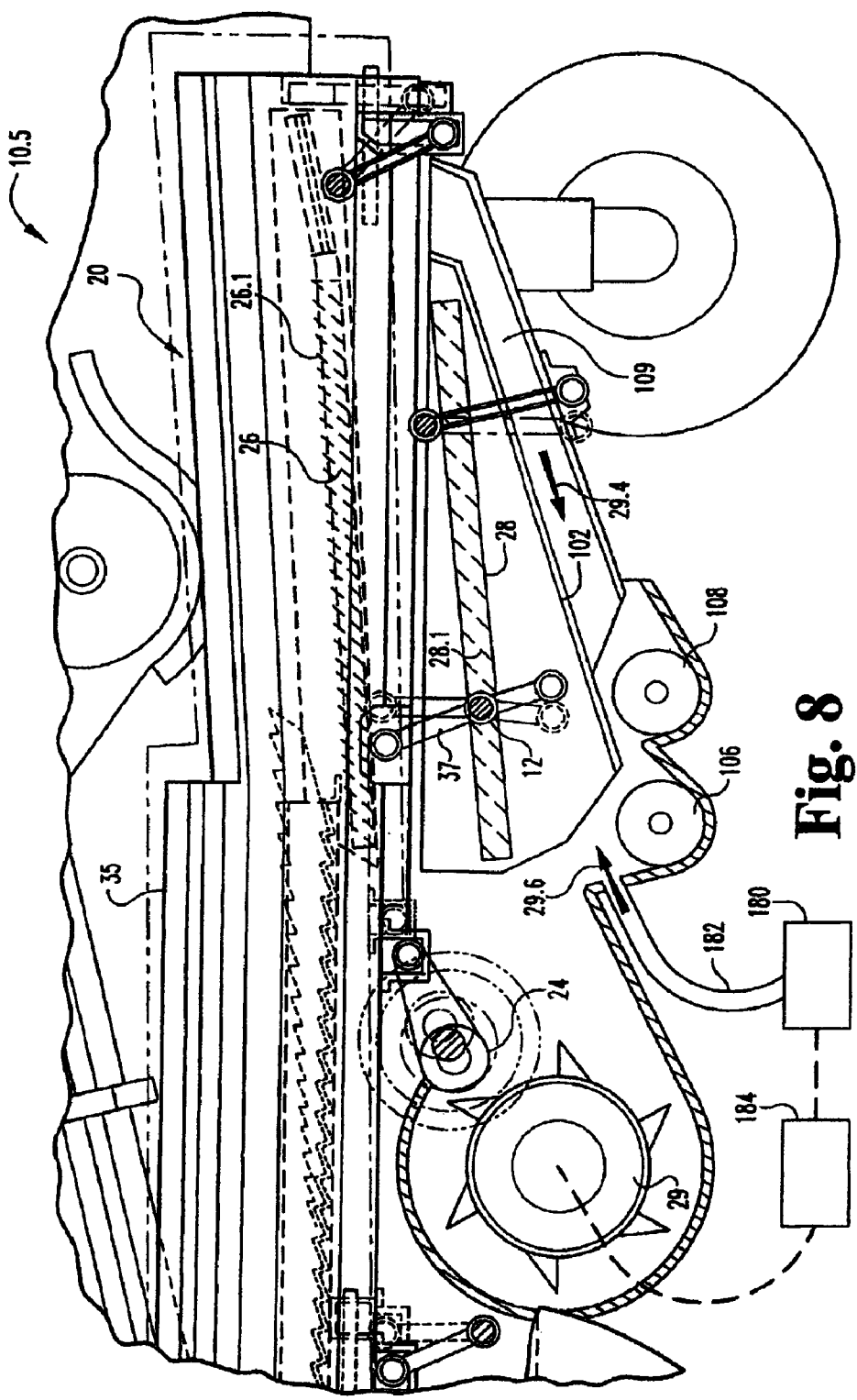
FIG. 8 is a cutaway, side elevational view of an apparatus according to another embodiment of the present invention.

Referring to FIG. 8, a combine 10.5 according to another embodiment of the present invention is shown. Combine 10.5 is the same as combine 10, except for the differences shown and discussed hereafter. Combine 10.5 includes a second air blower or fan 180 which is connected by a duct 182 to direct a flow of air in the direction shown by arrow 29.6 between clean grain pan 102 and bottom sieve 28. In some embodiments, fan 180 provides a flow of air into shoe assembly 20 that is significant enough to entrain air within pathway 109 to flow as indicated by arrow 29.4.

In other embodiments of the present invention, the operation of blower 180 and fan 29 is controlled by an electronic controller 184, such as a digital computer. Controller 184 adjusts the speed of blower 180 in proportion to the speed of fan 29 so as to create the entrainment effect as previously described (i.e., to reverse the flow within pathway 109). In yet other embodiments, the speed of both fan 29 and blower 180 are controlled by electronic controller 184 in accordance with a sensor mounted to either slats 28.1 of lower shoe 28 or the slats 26.1 of upper shoe 26. It is known to adjust the position of slats 26.1 and/or 28.1 in accordance with the type of grain being harvested. In one embodiment, the selected angle of the slats is provided from a sensor operatively connected thereto. The sensor signal is provided to computer 184, which controls the speeds of fans 29 and 180.

Figure 9:
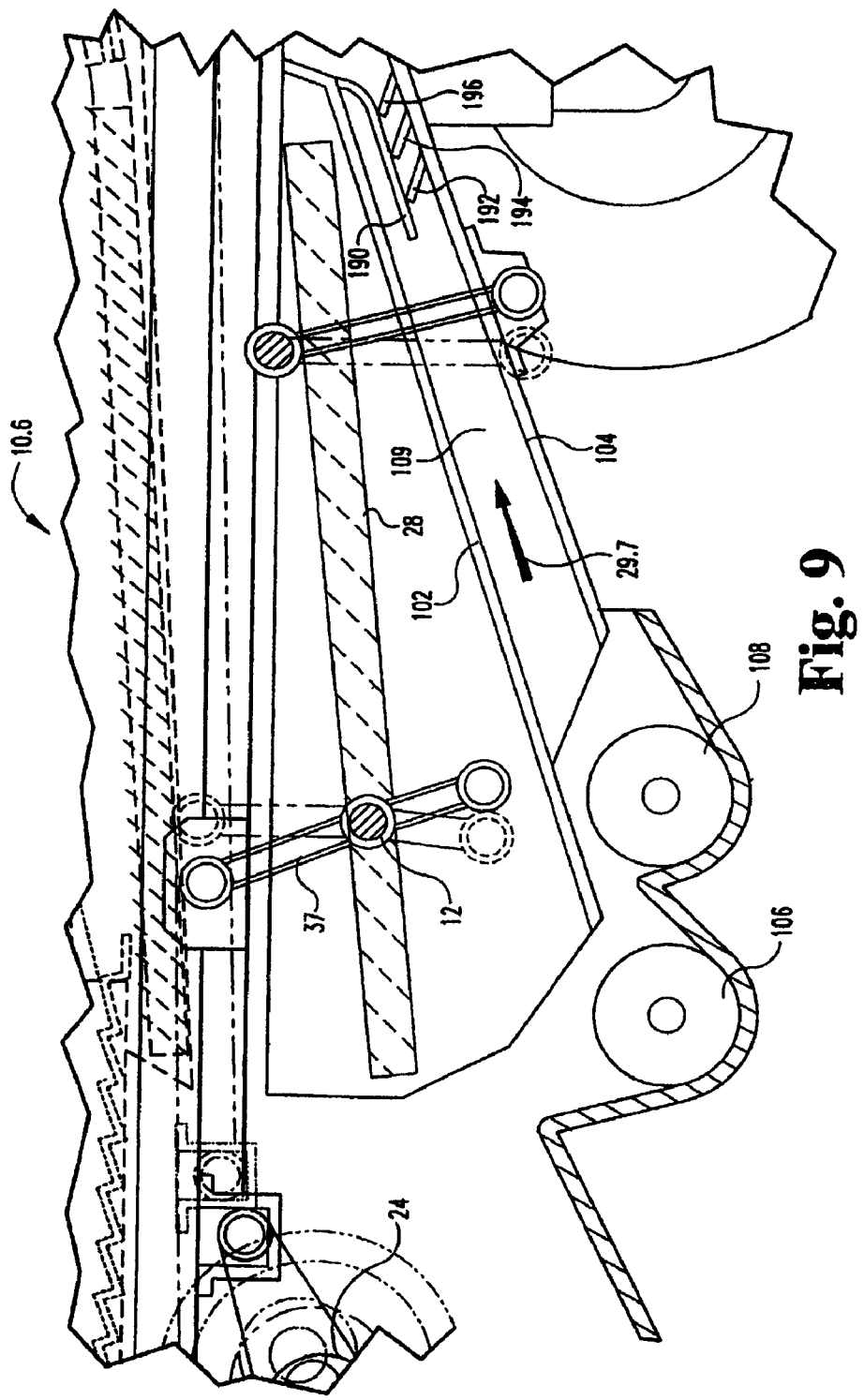
FIG. 9 is a cutaway, centerline, side elevational view of an apparatus according to another embodiment of the present invention.

Referring to FIG. 9, a portion of a combine 10.6 according to one embodiment of the present invention is shown. Combine 10.6 is the same as combine 10, except for the differences shown and described herein. Combine 10.6 includes a flexible aft seal 190 which is attached at one end to clean grain pan 102. A flexible portion of seal 190 extends over a plurality of forward facing ridges or stationary ridges or slats 192, 194, and 196.

Seal 190 coacts with ridges 192, 194, and 196 to form a seal that discourages the flow of air in path 109 indicated by arrow 29.7 in pathway 109. However, slats 192, 194, and 196, and seal 190 are adapted and configured to permit the flow of tailings down the tailings pan 104 and into tailings auger 108. As seal 190 reciprocates back and forth because of its attachment with shoe assembly 20, the seal pushes tailings in a direction from slat 196 to slat 194, then to slat 192, and subsequently down into auger 108.

FIGS. 10-15 show a portion of a combine 10.7 according to another embodiment of the present invention. Combine 10.7 is the same as combine 10, except for the differences shown and discussed hereafter. FIGS. 10-14 have been made from photographs of hardware.

Combine 10.7 includes various components which can be incorporated on an existing combine in a kit of parts. In one embodiment of the present invention, there is a kit of parts for sealing a combine such as a New Holland CR960 combine, such as the kit shown and described with reference to FIGS. 10-15. However, the present invention is not so limited and the apparatus and principles described herein are applicable to any combine with a self-leveling shoe assembly.

Combine 10.7 includes a sheet metal auger cover 202 that is located generally over a portion of clean grain auger 106. Auger cover 202 is preferable mounted to the combine frame, and does not pivot with the self-leveling shoe.

Auger cover 202 supports on opposite sides right and left side stationary seals 210 and 211, respectively. Stationary seals 210 and 211 extend from the distal-most ends of auger cover 202 and include vertical portions 210.1 and 211.1 which extend upward toward the oscillating shoe assembly 20 and outward toward static structure of the combine 10.7. Both auger cover 202 and stationary side seals 210 and 211 do not roll with the rolling and self-leveling action of shoe assembly 20, but rather are preferably fixed in location relative to auger 107 and other portions of the combine frame. The vertical portions 210.1 and 211.1 extend both upwardly and outwardly, as best seen in reference to seal 211 in FIG. 10. The vertical and outward flaring portion 211.1 and 210.1 provide contacting surfaces for preferably flexible side pivoting seals 214 and 215, respectively. Side seal members 214 and 215 are attached to pivoting side seal support members 212 and 213, respectively. Support members 212 and 213 are attached to portions of shoe assembly 20 such that support members 212 and 213 roll about the longitudinal axis of combine 10.7 as shoe assembly 20 rolls to maintain its level operation. Although seal support members 212 and 213 pivot with shoe assembly 20, they are fixed to the pivoting frame of the shoe assembly and therefore do not oscillate as these shoes reciprocate.

Figure 10:
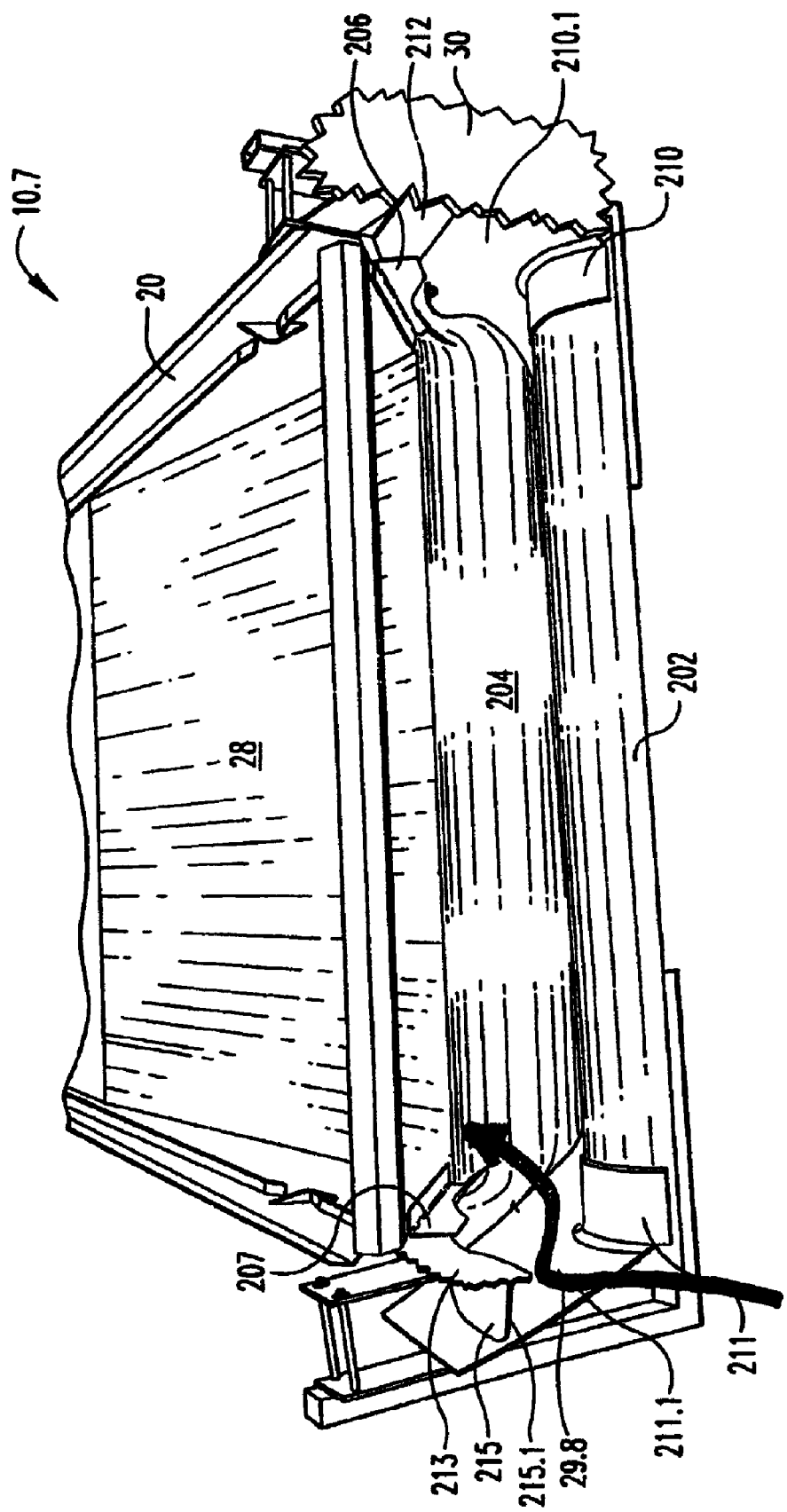
FIG. 10 is a top, rearward-facing perspective view of an apparatus according to another embodiment of the present invention.
Figure 11:
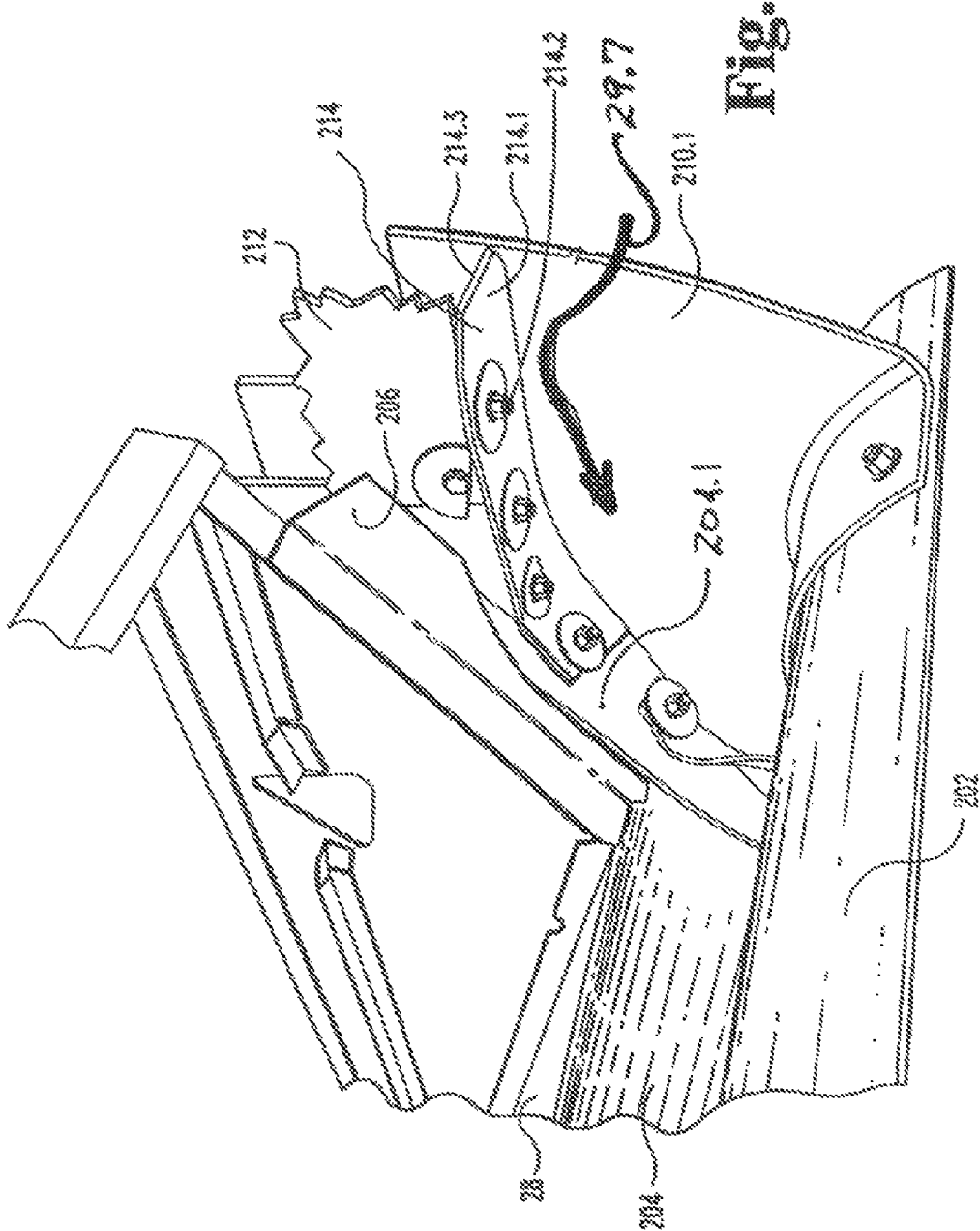
FIG. 11 is a close up view of a portion of the apparatus of FIG. 10.

As best seen in FIGS. 10 and 11, flexible pivoting side seals 214 and 215 obstruct airflow from fan 29 that would otherwise flow into the right side and left side gaps 121 and 123, respectively. Referring to FIG. 10, arrow 29.8 represents a flow path for air being discharged from fan 29 which initially flows upward toward horizontal surface 215.1 of flexible seal 215, but is instead obstructed by seal 215, and therefore flows generally toward lower cleaning shoe 28. Referring to FIG. 11, arrow 29.7 depicts the flow of air exiting fan 29 and initially flowing upward toward the horizontal, spanwise portion 214.1 of flexible seal 214, the flow thereafter being redirected generally aft toward lower cleaning shoe 28.

Figure 14:
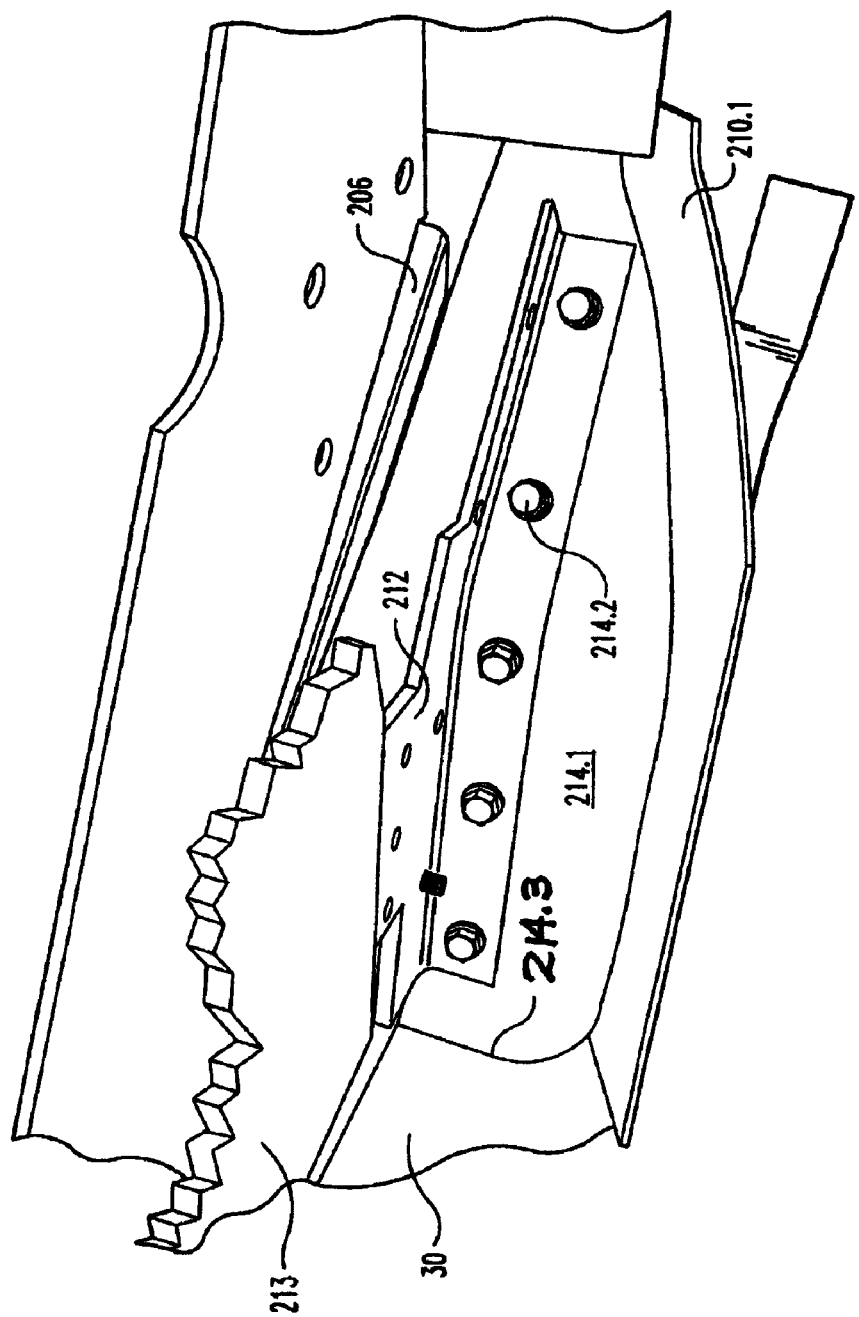
FIG. 14 is a perspective view of a portion of the right side of the apparatus of FIG. 10 as viewed from above.

As best seen in FIGS. 11 and 14, the laterally-extending seal portions 214.1 and 215.1 are attached by a plurality of fasteners 214.2 and 215.2 (not shown), respectively, to pivoting side seal supports 212 and 213, respectively. However, the various embodiments of the present invention are not so limited. Pivoting flexible seals 214 and 215 can be attached in any manner to pivoting seal supports 212 and 213, respectively, including for instance by rivets or adhesive bonding as two examples. Further, although flexible seals 214 and 215 have been shown and described as pivoting as shoe assembly 20 pivots to maintain a level orientation, the present invention is not so limited. The present invention also includes those embodiments in which flexible lateral seals are attached to stationary structure, such as stationary seals 210 and 211. In these embodiments, the flexible seals would not pivot, but would maintain an obstruction to airflow which would otherwise go laterally around shoe assembly 20.

Figure 12:
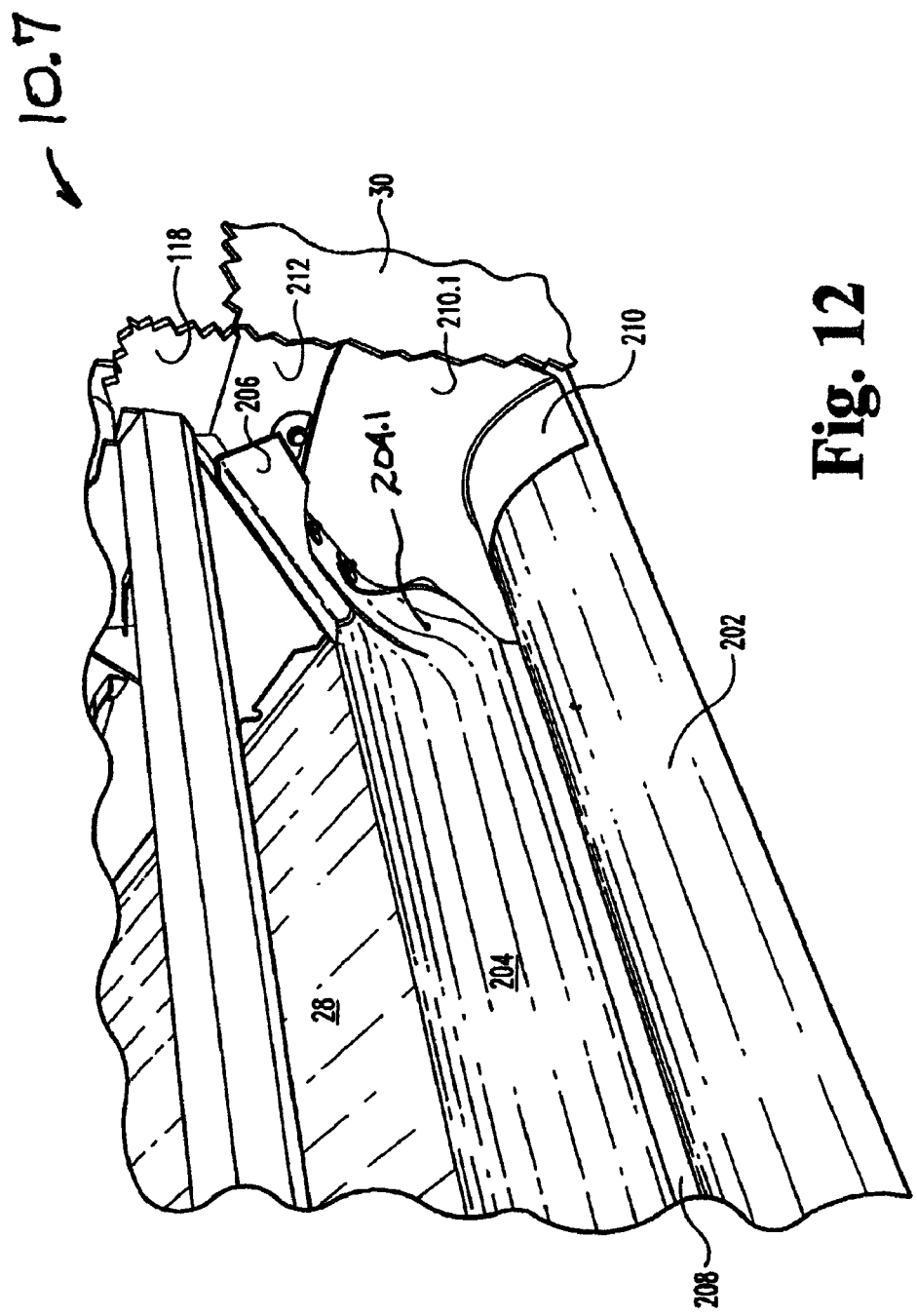
FIG. 12 is a perspective view of the right forward portion of the apparatus of FIG. 10.

Referring to FIGS. 10, 12, and 14, combine 10.7 includes a cover 30 which at least partly houses fan 29. Flexible side seals 214 and 215 include forward portions 214.3 and 215.3 (not shown), respectively, which extend forward toward fan housing 30. These forward portions of the flexible side seals generally obstruct flow which would otherwise leak in front of the fan housing. Referring to FIG. 12, a portion 208 of the reciprocating shoe can be seen aft of auger cover 202 and in front of flexible seal 204.

Figure 13:
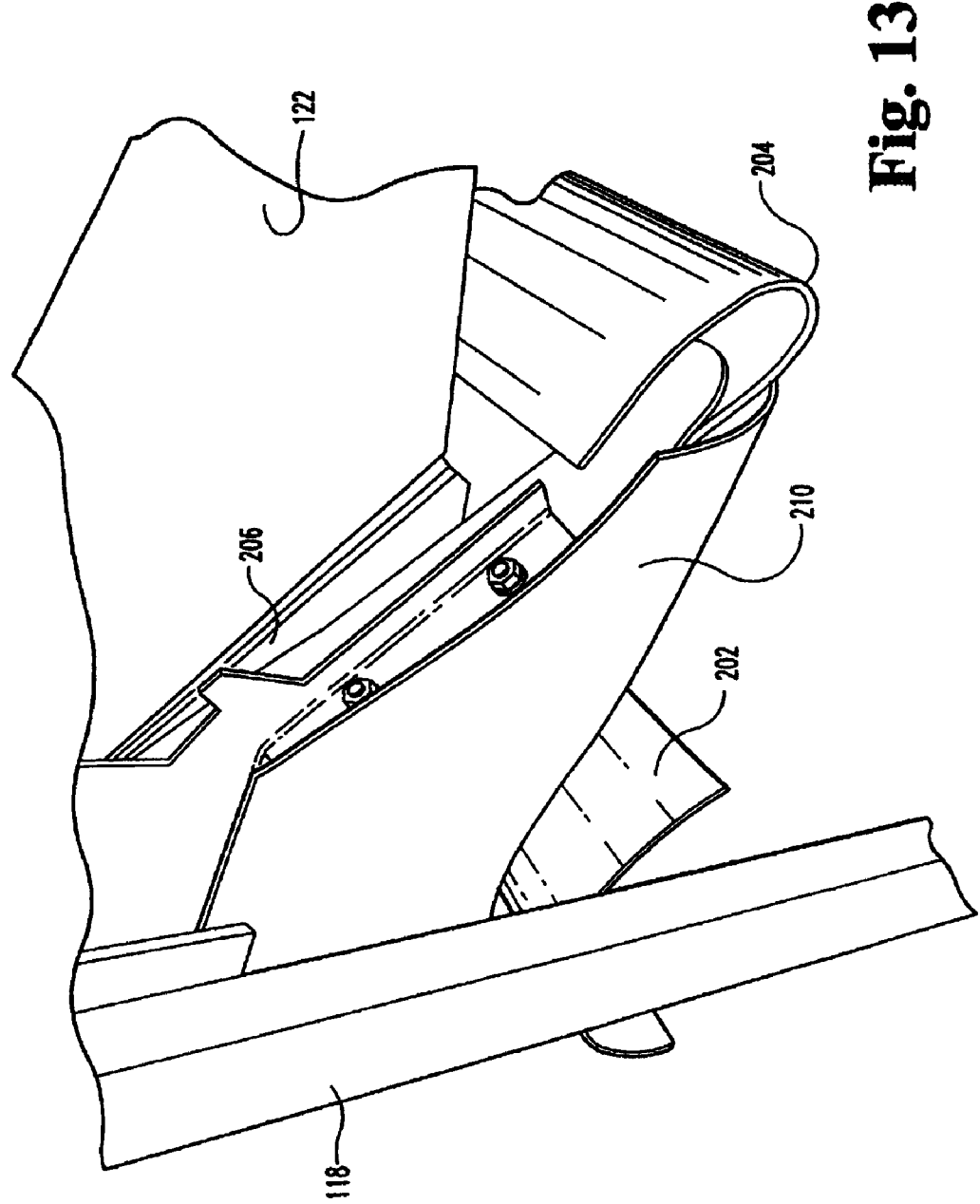
FIG. 13 is a perspective view of a portion of the right side of the apparatus of FIG. 10 as viewed from behind.

In some embodiments of the present invention, combine 10.7 further includes a lower shoe flexible seal 204 as best seen in FIGS. 10, 12, and 13. Preferably, lower seal 204 is attached to lower cleaning shoe 28, and moves along with the self-leveling pivoting motion of the shoe and also moves with the reciprocating motion of the shoe. Lower shoe flexible seal 204 obstructs air from flowing under shoe 28.

Flexible lower seal 204 extends generally across the width of shoe 20. Seal 204 is supported at the right and left sides by shoe extension attachment members 206 and 207, which in one embodiment are sheet metal brackets which are attached to lateral sides of the shoe assembly. In addition, in one embodiment, seal 204 is attached to the underside of shoe assembly 20 across the width of the shoe.

Figure 15:
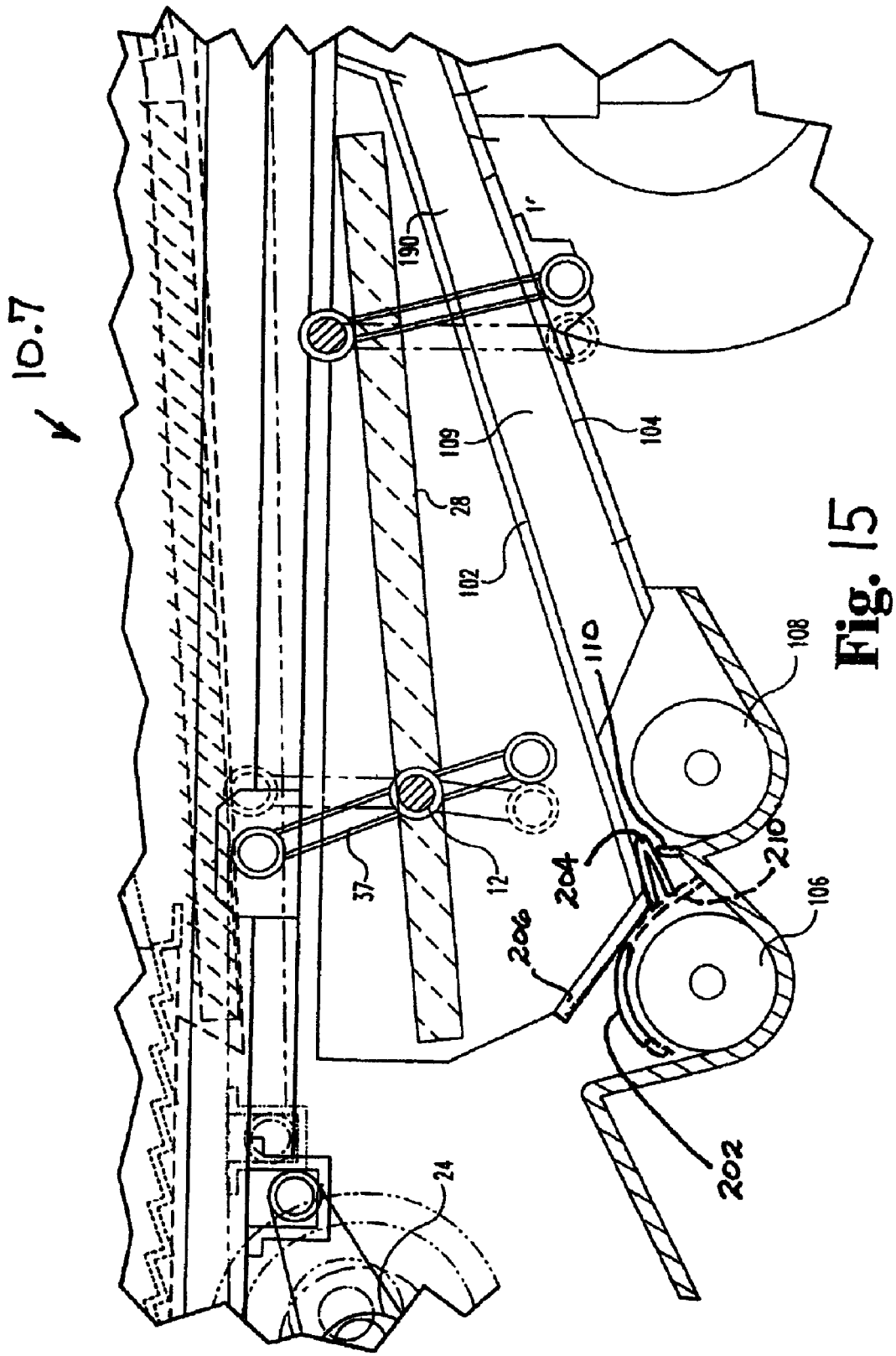
FIG. 15 is a cutaway, centerline, side elevational view of the apparatus of FIG. 10.

As best seen in FIG. 15, in one embodiment seal 204 is of sufficient length to fold over and contact a portion of the combine in-between augers 106 and 108, such as static seal 110. FIG. 15 also illustrates the placement of auger cover 202 relative to auger 106, and also illustrates how side stationary shoe 210 is positioned relative to auger 106.

As best seen in FIGS. 11 and 12, in some embodiments lower seal 204 includes a slack portion 204.1 which extends upward and forward from seal 204 toward an interface with the upper aft surface of side stationary seal 210. As best seen in FIG. 11, this flap 204.1 of seal 204 is attached to pivoting side seal support 212 by one or more fasteners 214.2. The slack or looseness in flap 204.1 permits one portion of seal 204 (generally spanwise across the width of shoe 28) to reciprocate with shoe 28, and another portion of the seal (flap 204.1) to be attached to a pivoting but non-oscillating structure (pivoting seal support 212).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combine comprising:
 a frame mobilely supported over the ground by wheels;
 a crop harvesting header supported by the frame to gather crop material and convey to crop material rearwardly;
 a threshing and separating mechanism on the frame that receives the crop material from the crop harvesting header to thresh the crop material into threshed grain and to separate the threshed grain;
 a shoe assembly positioned beneath the threshing and separating mechanism to receive the threshed grain and connected to a drive that affects the fore-and-aft reciprocating movement of the shoe assembly to convey the threshed grain in a rearward direction; and
 a flexible seal that is attached to an underside of the shoe assembly across the width of the shoe to obstruct air from flowing under the shoe assembly.

2. The combine of claim 1 wherein the flexible seal is supported by attachment members that are attached to lateral sides of the shoe assembly.

3. The combine of claim 1 wherein the shoe assembly has a lower shoe that receives the threshed grain and transports the threshed grain to grain augers on the frame of the combine.

4. The combine of claim 3 wherein the flexible seal is of sufficient length to fold over and contact a portion of the combine in between the augers.

5. The combine of claim 3 wherein the flexible seal includes a slack portion that extends upward and forward from the seal toward an interface with a surface of a side stationary seal.

6. The combine of claim 5 wherein the slack portion of the flexible seal is attached to a pivoting side seal support such that the slack portion permits a portion of the flexible seal to reciprocate with the lower shoe and another portion of the flexible seal is attached to a pivoting but non oscillating structure.

7. The combine of claim 6 wherein the pivoting but non oscillating structure is the pivoting side seal support.

* * * * *